United States Patent [19]
Hodson et al.

[11] Patent Number: 4,948,393
[45] Date of Patent: Aug. 14, 1990

[54] METHOD OF SEPARATING OIL, WATER, SAND, AND GAS FROM PRODUCED FLUIDS

[75] Inventors: John E. Hodson, Reading, England; Michael D. Chalmers, Aberdeen, Scotland

[73] Assignee: Chevron Research Company, San Francisco, Calif.

[21] Appl. No.: 376,728

[22] Filed: Jul. 7, 1989

[51] Int. Cl.$^5$ .............................................. B01D 19/00
[52] U.S. Cl. ........................................... 55/40; 55/43; 55/45; 55/46; 55/48; 55/49; 55/55; 55/174; 208/186
[58] Field of Search ................................. 55/40–42, 55/43, 45, 46, 48, 49, 55, 172, 174, 175, 176; 166/266, 267; 210/800; 208/186

[56] References Cited

U.S. PATENT DOCUMENTS

| | | | |
|---|---|---|---|
| 2,457,959 | 1/1949 | Walker | 166/266 |
| 2,765,045 | 10/1956 | Meyers | 55/43 |
| 3,469,373 | 9/1969 | Lavery | 55/176 |
| 3,759,324 | 9/1973 | Mecuster | 166/267 |
| 4,778,443 | 10/1988 | Sands et al. | 55/43 |

Primary Examiner—Bernard Nozick
Attorney, Agent, or Firm—Edward J. Keeling

[57] ABSTRACT

The invention deals with separating production fluids into separate components of oil, water, sand and gas in first and second stage separators. Preheating of the production fluid prior to entry into the first stage separator is partially accomplished by direct mixing with hot processed water taken from the effluent of the first stage separator and the second stage separator. Recirculated processed water may also be used to improve sand removal from the first and second stage separators.

2 Claims, 1 Drawing Sheet

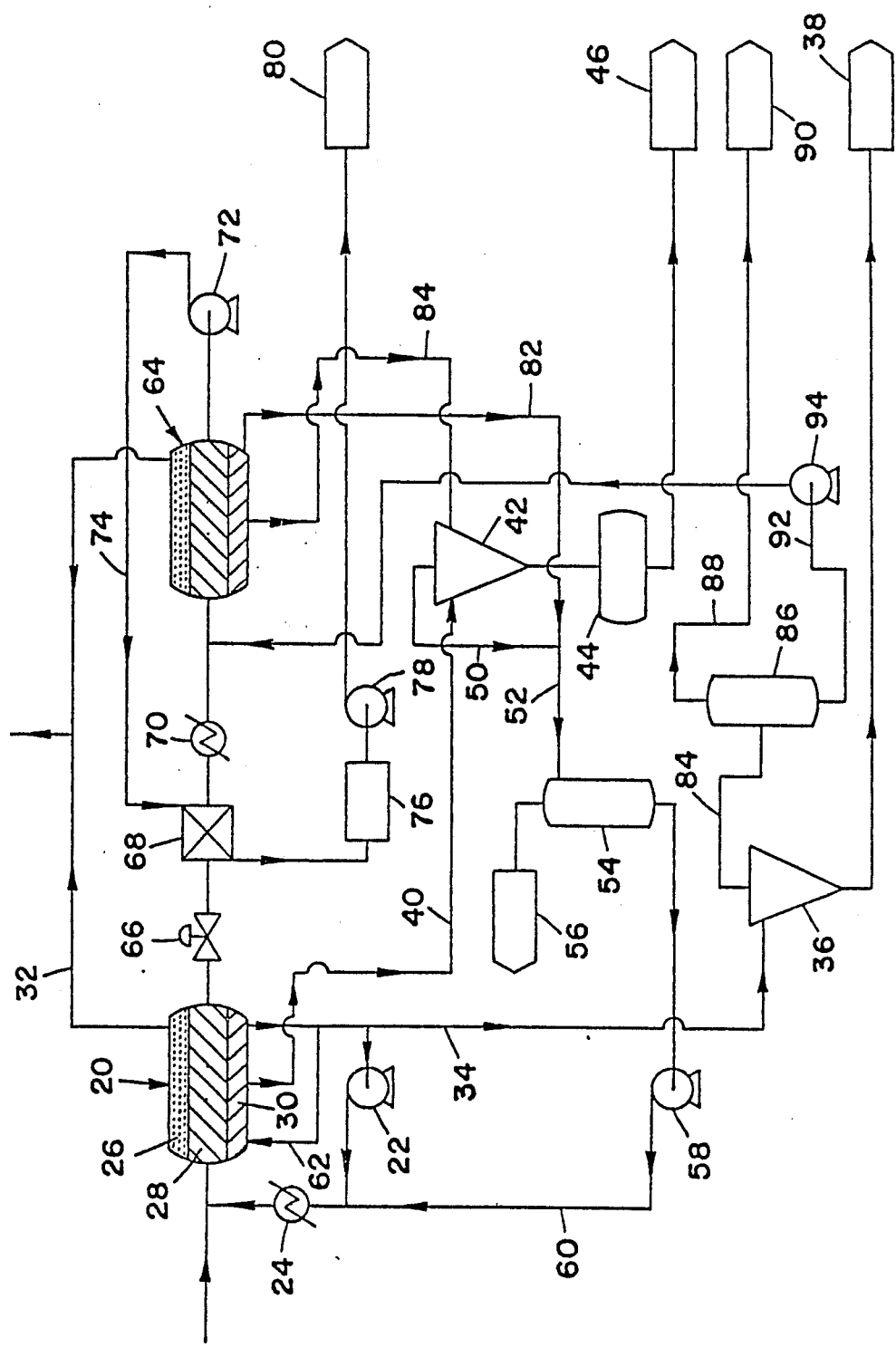

4,948,393

METHOD OF SEPARATING OIL, WATER, SAND, AND GAS FROM PRODUCED FLUIDS

FIELD OF THE INVENTION

The present invention relates to separating oil, gas, sand, and water from hydrocarbon-containing fluids produced from underground formations. More particularly, the invention deals with separating produced fluids into components of gas and oil suitable for transfer from an offshore platform for further refinement or use and into components of sand and water suitable for disposal.

BACKGROUND OF THE INVENTION

Production fluids which include oil, water, gas, and entrained sand from a well penetrating a hydrocarbon formation must be separated into separate components for transportation from the production site or in the case of sand and water for disposal. When production is obtained on an offshore structure, special problems are encountered because of the limited space available for process equipment. This is especially true when the production fluids include low API gravity oil (for example, less than 25 API). This type of heavy oil is viscous and relatively dense. Also when production is offshore, the oil usually arrives at the platform cold. Handling process fluids, including dense viscous cold oil, requires large processing equipment thus reducing the viability of many heavy oil field developments particularly in the offshore environment. Many techniques have been suggested for handling production fluids in such circumstances but none have been entirely satisfactory.

SUMMARY OF THE INVENTION

The present invention provides a method of separating fluids produced from a production well on an offshore platform into separate components of oil, gas, water, and sand. The production fluid containing oil, water, gas, and sand is flowed from a production location toward a first stage separator. Prior to flowing the production fluid to the first stage separator, the production fluid is mixed with heated produced water obtained from the effluent of the first stage separator. The produced water effluent is heated to a temperature of between about 120° C. to 160° C. and is mixed with the cooler produced fluid in sufficient amount to heat the produced fluid to between about 50° C. to 80° C. The thus heated produced fluid is flowed into said first stage separator to permit a first stage separation of the production fluid into a primarily gas component, a primarily oil-gas-water-sand component and a primarily produced water-sand component.

A portion of produced water is removed from the produced water-sand component in the first stage separator and this portion of the produced water is heated in a first heater to heat the portion of produced water to between about 120° C. to 160° C. The heated portion of the produced water is continuously mixed with the production fluids prior to passing the production fluid to the first stage separator. Gas is removed from said first stage separator. A portion of the sand in the produced fluid is removed from the first stage separator. The remaining oil-gas-water-sand component is also flowed out of the first stage separator and is heated to a temperature of between about 80° C. to 110° C.

The heated oil-gas-water-sand component is flowed to a second stage separator and allowed to separate into separate components. Additional gas is removed from the second stage separator. Sand is also taken from the second stage separator. Oil is removed from the second stage separator and is passed in heat exchange contact with the oil-gas-water-sand component leaving the first stage separator prior to flowing the oil-gas-water-sand component into the second stage separator. Produced water is removed from the second stage separator. A portion of the produced water effluent from the second stage separator is combined with the portion of produced water from the first stage separator prior to heating the thus combined produced water to between about 120° C. to about 160° C. for mixing with produced fluids coming from the production well.

The method of the present invention also includes the step of recirculating a portion of the produced water removed from the first stage separator back into the first stage separator to assist in removing sand from the first stage separator. The method also contemplates recirculating a portion of the produced water from the second stage separator back into the second stage separator to assist in recovering sand from the second stage separator.

OBJECTS OF THE INVENTION

It is a particular object of the present invention to provide a method of separating oil-gas-water and sand from production fluids on an offshore platform where space for equipment is limited. It is also an object of the present invention to provide an efficient method of separating a high viscosity/low API gravity oil (for example, less than 25 API) from gas, water, and sand. Additional objects and advantages of the present invention will become apparent from reading the following detailed description in view of the accompanying drawing which is made a part of this specification.

BRIEF DESCRIPTION OF THE DRAWING

FIG. 1 of the drawing is a process flow diagram illustrating in block diagram form an assembly of apparatus useful in the preferred embodiment of the invention.

DETAILED DESCRIPTION OF THE INVENTION

Basically, the present invention deals with produced fluid from platform production and/or subsea production wells. The produced fluid flows through a choke valve and a production header into a first stage separator 20 where the majority of the gas is separated from the liquids and sand. The separation of the high viscosity/low API gravity oil (for example, less than 25 API), water and sand is enhanced by heating the separator to 50° C. to 80° C. The production fluid is heated by direct mixing the produced water recirculated from the outlet of the first stage 20 and second stage 64 separators.

The content of the production fluid leaving the first separator 20 can be varied between 10% and 40% water. This proportion controls the sizing of the first stage separator 20 using the central 40% of the separator cross-section area 28. The bottom 20% of the separator cross-section area 30 is for produced water, the top 40% cross-section area 26 is for gas. A portion of the produced water is circulated through the heater 24 and heated to 120° C./160° C. range to maintain the 70°

C./80° C. required for optimum design of the first stage separator 20.

Part of the produced water (5% to 10%) is circulated through the bottom 30 of the separator 20 to remove sand. This is a continuous circulation system operating for varying periods through four individual compartments within the separator.

The 10%/30% oil and water mixture which also contains suspended sand particles is further heated to 80° C. to 110° C. before entering the second stage separator 64.

A heater, 68, exchanges heat between the product oil and the fluid from the first stage separator 20. A heater, 70, controls the second stage separator temperature in the range of 80° C. to 110° C. depending on the oil properties and temperature required for optimum separator size. The pressure in this separator controls the export vapor pressure specification of the oil.

A portion of the produced water is recirculated to the first stage separator 20. As for the first separator, sand is removed from the second stage by circulating a portion of the produced water.

For low API gravity oils, the viscosity and density of an oil increases. Separation of oil, water, gas, and any entrained sand (or clay) particles becomes much more difficult with large processing equipment required. This significantly reduces the viability of many heavy oil field developments particularly in the offshore environment. The present invention is particularly useful with oil of low API gravity (normally below 25 API), cold oil from subsea well and low temperature reservoir fluid.

To reduce the size of the processing equipment used for the oil, water, gas, and sand separations, the reservoir fluid must be heated to high temperature to reduce the viscosity of the oil and water phases. The size of the first stage separator is usually controlled by the water-in-oil specification required for the liquid to the second separator. With viscous oils, gas and sand are also difficult to remove from the oil phase. Heating the wellhead fluid to temperature between 50° C. to 80° C. and preferably 70° C. to 80° C. helps to alleviate all these problems. To heat the wellhead fluid, produced water is heated to 120° C. to 165° C. in the recycle heater 24 and mixed with the incoming produced fluid. This "direct contact" heat exchange overcomes the normal difficult problems of heating surges of oil, produced water, gas, and sand with conventional shell and tube heat exchangers. Due to poor heat transfer, the exchanger would need to be large multishells which would almost certainly be subject to blocking with sand, erosion due to large two-phase velocity in the tubes and large dirt coefficient due to coking/solid deposition on the tubes.

At peak of production rate, there is spare capacity in the separator handling capacity of produced water. This enables a significant quantity of produced water to be circulated without reaching the maximum oil in produced water specification for treatment in hydrocyclones. In most oil fields, the wellhead fluid temperature increases with water cut. In the first separator, the increase in wellhead temperature and produced water rate will result in a lower produced circulation rate being required for heating. This together with level changes in the separator enables large quantities of water to be processed in the latter stages of the field life with no increase in the first stage separator and heat exchanger equipment sizes and possibly very little increase in the heating energy requirement. The produced water circulation has additional benefits in enhancing the breakdown of oil/water emulsion; helping to remove sand from oil particularly at low water cuts; and controlling the addition of demulsifying chemicals.

In the second stage separator 64, the amount of heat energy required to heat the oil to a temperature range of 80° C. to 110° C. to achieve a 2% water-in-oil specification is significantly reduced by (1) removing the maximum quantity of water in stage one separator; (2) recovery of heat from the export oil by the inlet fluid; and (3) recycle the produced water removed in the separator. A heater, 70, becomes smaller in size and has good control for optimizing the energy required for various pipeline oil-in-water/vapor pressure specifications.

The high temperature in the second stage separator enhances the removal of sand particles from the oil into the water layer where it is removed by a produced water jetting system. For an offshore platform, the heating energy for heaters is normally provided from the waste heat recovery from turbine exhaust gas. The minimum heating energy requirement is achieved by operating the first stage separator 20 at the lowest possible temperature. The produced water is dumped overboard via the hydrocyclones. The oil product is exported at a temperature 5° C. to 10° C. above the first stage temperature.

Wellhead fluid quality, temperature, etc., can vary greatly from well tests and also through the life of a field particularly if other oil fields, subsea wells, etc., are added to an existing field. The main advantages of this process are the control variables available to process changes which may occur in the wellhead fluid. The process parameters which can be changed to optimize operations include:

temperatures in the first and second stages of separation,
produced water circulation rates,
water jetting rates,
temperature of the heating medium,
temperature of the circulating produced water,
pipeline export specifications,
circulated water for start-up of cold system for heavy oil,
handling varying quantities of water,
handling surges better from subsea or pipeline system, and
optimizing overall platform energy usage.

Referring specifically to the drawing, the present invention will be described in greater detail. Production fluid from subsea wells and/or from a production platform is flowed to an offshore structure for separation into the components that make up the production fluid. The drawing illustrates the preferred embodiment of apparatus useful for separating production fluid into components of oil, gas, water, and sand. The production fluid is normally flowed through a choke valve and a production header (not shown) into a first stage separator 20. The production fluid is preheated prior to flowing the production fluid into the first stage separator 20. Produced water taken from the production separator is passed through pump 22, heater 24 and mixed directly with the production fluids prior to entry into the first stage separator. Preferably, the produced water is heated to a temperature between about 120° C. to 160° C. and is mixed with the production fluids in an amount sufficient to raise the temperature of the production fluids to between about 50° C. to 80° C. and preferably 70° C. to 80° C. as it enters the first stage separator.

The production fluid in the first stage separator 20 is allowed sufficient time to separate into a primary gas component 26, a primary oil component 28, which also contains some residual gas, residual water and residual sand, and a primary produced water-sand component 30. Gas is removed from the top of the first stage separator and passed via line 32 to a compression station (not shown). The portion of produced water not recirculated is passed via line 34 to a hydrocyclone 36 and then to a produced water caisson 38 for disposal. Sand is removed from the first stage separator 20 via line 40 to a sand cyclone 42 where any remaining produced water and gas are removed. The sand then is moved to a sand treater 44 prior to removal to a sand caisson 46 for disposal. The residual gas and produced water from the sand cyclone 42 are removed through lines 50 and 52, respectively, to gas-water separator 54. The residual gas is flared at flare 56 and the residual produced water is removed through pump 58 through line 60 to combine with the produced water taken directly from the first stage separator for heating in heater 24.

In accordance with the invention, a portion of the produced water removed from the first stage separator 20 is recircled via line 62 into the sand portion 30 of the first stage separator 20 to assist in removing sand from the first stage separator. The oil-gas-water-sand component of the mid-portion 28 of the first stage separator is flowed toward a second stage separator 64. This component passes through valve 66, preheater 68 and heater 70 prior to entering the second stage separator 64. Preheater 68 provides for heat exchange between oil taken from second stage separator 64 and passed via pump 72 and line 74 to the heater 68.

The oil is preferably heated to a temperature which permits ready flow in handling of the oil. The oil from heater 68 is metered at meter 76 and moved through pump 78 to export station 80. Produced water is removed from second stage separator 64 via line 82 and is passed through separator 54 for combination with other produced water for use in the preheating step. Sand and produced water are also removed from the second stage separator 64 via line 84 to the sand cyclone 42. Produced water via line 62 may also be used to assist in sand removal from the second stage separator 64. A small amount of oil which is recovered from hydrocyclone 36 is removed via line 84 to a gas-oil separator 86. Gas from the separator 86 is flowed via line 88 to flare 90 while oil is moved via line 92, pump 94 to combine with the fluids entering the second stage separator 64.

From the above description, it is evident that the present invention provides a process for separating the components of a production fluid stream in an efficient manner. Although only specific embodiments of the present invention have been described in detail, the invention is not limited thereto but is meant to include all embodiments coming within the scope of the appended claims.

What is claimed is:

1. A method of separating fluids produced from a production well into separate components of oil, gas, water, and sand comprising flowing production fluid containing oil, water, gas, and sand from a production location toward a first stage separator, prior to flowing said production fluid to said first stage separator mixing said production fluid with heated produced water obtained from the effluent of said first stage separator and having a temperature of between about 120° C. to 160° C. in sufficient amount to heat said production fluid to between about 50° C. to 80° C., flowing said heated production fluid into said first stage separator to permit a first stage separation of the production fluid into a primarily gas component, a primarily oil-gas-water-sand component and a primarily produced water-sand component, continuing to separate substantial portion of produced water from the produced water-sand component in said first stage separator and passing a portion of said produced water to a first heater to heat said produced water to between about 120° C. to 160° C., continuing to mix said heated produced water with said production fluids prior to passing said production fluid to said first stage separator, removing gas from said first stage separator, and removing sand from said first stage separator, removing the oil-gas-water-sand component from said first stage separator, reheating said oil-gas-water-sand component to a temperature of between about 80° C. to 110° C., flowing said reheated oil-gas-water-sand component to a second stage separator, separating said oil-gas-water-sand into a gas component, a produced water component, a sand component and an oil component, removing gas from said second stage separator, removing sand from said second stage separator, removing oil from said second stage separator, removing produced water from said second stage separator, passing said removed oil in heat exchange contact with said oil-gas-water-sand component prior to flowing said oil-gas-water-sand component into said second stage separator and circulating a portion of the produced water effluent from said second stage separator and combining said portion of produced water with the produced water from said first stage separator prior to heating the produced water to between about 120° C. to about 160° C. for mixing with produced fluids coming from said production well.

2. The method of claim 1 further characterized in that a portion of the produced water removed from said first stage separator is recirculated back into said first stage separator to assist in removing sand from said first stage separator.

* * * * *